(12) United States Patent
Hayakawa et al.

(10) Patent No.: US 8,145,385 B2
(45) Date of Patent: Mar. 27, 2012

(54) VEHICLE DRIVING CONTROL APPARATUS AND VEHICLE DRIVING CONTROL METHOD

(75) Inventors: Yasuhisa Hayakawa, Yokohama (JP); Ko Sato, Atsugi (JP); Masahiro Kobayashi, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 402 days.

(21) Appl. No.: 12/489,959

(22) Filed: Jun. 23, 2009

(65) Prior Publication Data

US 2010/0023218 A1    Jan. 28, 2010

(30) Foreign Application Priority Data

Jul. 28, 2008 (JP) .................................. 2008-193461
May 21, 2009 (JP) .................................. 2009-122834

(51) Int. Cl.
G08G 1/16 (2006.01)

(52) U.S. Cl. ......................................... 701/42; 340/436

(58) Field of Classification Search .................... 701/42, 701/41, 117, 301, 116, 36, 70, 300; 340/435, 340/436, 438, 995.21, 903; 180/280
See application file for complete search history.

(56) References Cited

U.S. PATENT DOCUMENTS

| | | | |
|---|---|---|---|
| 5,483,453 A * | 1/1996 | Uemura et al. .................. | 701/23 |
| 7,603,215 B2 * | 10/2009 | Matsumoto et al. ............. | 701/41 |
| 7,620,497 B2 | 11/2009 | Maass | |
| 2004/0252020 A1 | 12/2004 | Matsumoto et al. | |
| 2005/0125125 A1 | 6/2005 | Matsumoto et al. | |
| 2005/0273264 A1 | 12/2005 | Gern et al. | |

FOREIGN PATENT DOCUMENTS

| | | |
|---|---|---|
| DE | 103 11 518 A1 | 11/2003 |
| DE | 10 2005 016 086 A1 | 10/2006 |
| DE | 10 2005 028 370 A1 | 12/2006 |
| JP | 08-253160 | 1/1996 |

* cited by examiner

Primary Examiner — Dalena Tran
(74) Attorney, Agent, or Firm — Global IP Counselors, LLP

(57) ABSTRACT

A vehicle driving control apparatus is provided with an obstacle detecting device, a future position estimating device, an obstacle avoidance control device, and a lane change intent detecting device. The obstacle detecting device detects an existence of an obstacle positioned laterally of a host vehicle. The future position estimating device estimates a future position of the host vehicle after a prescribed amount of time. The obstacle avoidance control device executes an obstacle avoidance control. The lane change intent detecting device detects an intent of a driver to effect a lane change and a direction of the intended lane change. Therefore, when it is detected that the driver intends to move to an adjacent lane located on the opposite side of the vehicle as the side containing the obstacle, a control suppressing portion of the obstacle avoidance control device suppresses the obstacle avoidance control.

11 Claims, 8 Drawing Sheets

VEHICLE DRIVING CONTROL APPARATUS AND VEHICLE DRIVING CONTROL METHOD

CROSS-REFERENCE TO RELATED APPLICATIONS

This application claims priority to Japanese Patent Application Nos. 2008-193461, filed on Jul. 28, 2008, and 2009-122834, filed on May 21, 2009. The entire disclosures of Japanese Patent Application Nos. 2008-193461 and 2009-122834 are hereby incorporated herein by reference.

BACKGROUND OF THE INVENTION

1. Field of the Invention

The present application relates to a vehicle driving control apparatus and vehicle driving control method configured to control a vehicle so as to prevent a driver from steering toward an obstacle (e.g., another vehicle) existing in a region located laterally of the vehicle in which the apparatus and method are employed. In other words, the driver's steering operation is controlled so as to avoid approaching the obstacle at a dangerous proximity. This region includes a portion of an adjacent lane spanning from a directly adjacent position to a position rearward of the vehicle. In addition, the vehicle driving control apparatus and vehicle driving control method suppress this control of the vehicle when the driver has indicated an intent to move to a lane opposite the lane in which the obstacle exists.

2. Background Information

An example of a conventional apparatus technology serving to control a vehicle is presented in Japanese Laid-Open Patent Publication No. 08-253160. The apparatus determines if a steering operation occurs when a vehicle speed exceeds a predetermined vehicle speed. It then detects a distance from the vehicle to an obstacle existing in a region located laterally of the vehicle in a direction corresponding to a direction of the steering operation. If the distance to the obstacle is within a predetermined distance, a control is executed to prevent the driver from steering toward the obstacle. In this way, the driver can be warned that the vehicle is laterally approaching the obstacle.

In view of the above, it will be apparent to those skilled in the art from this disclosure that there exists a need for an improved vehicle driving control apparatus and vehicle driving control method. The present application addresses this need in the art as well as other needs which will become apparent to those skilled in the art from this disclosure.

SUMMARY OF THE INVENTION

It has been discovered that with the conventional technology described above, there are some driving situations in which a steering operation intended by a driver does not match a command issued by a vehicle control apparatus. For example, when a driver changes lanes, the driver will sometimes perform a preparatory operation in which the driver steers the vehicle in the direction opposite of the intended steering direction before steering the vehicle in the intended direction. With the conventional technology described above, the obstacle avoidance control is executed even during such a preparatory steering operation and thus causes the driver to experience an uncomfortable feeling of resistance.

The inventions of the present application were conceived in view of this issue. One object is to provide a vehicle driving control apparatus that is configured to execute an appropriate avoidance control with respect to a laterally positioned obstacle, and yet which is also configured to suppress this control when the driver has indicated an intent to steer away from the obstacle.

In order to achieve the object stated above, a vehicle driving control apparatus is provided with an obstacle detecting device, a future position estimating device, an obstacle avoidance control device, and a lane change intent detecting device. The obstacle detecting device is configured to detect an existence of an obstacle positioned laterally of a host vehicle in which the vehicle control apparatus is employed. The future position estimating device is configured to estimate a future position of the host vehicle after a prescribed amount of time. Based on the estimated future position of the host vehicle, the obstacle avoidance control device executes an obstacle avoidance control with respect to the host vehicle when the existence of an obstacle is detected. More specifically, the obstacle avoidance control device controls the host vehicle based on the estimated future position to prevent the host vehicle from laterally approaching the obstacle. The lane change intent detecting device is configured to detect an intent of a driver to effect a lane change and a direction of the intended lane change. Therefore, when it is detected that the driver intends to move to an adjacent lane located on the opposite side of the vehicle as the side containing the obstacle, a control suppressing portion of the obstacle avoidance control device suppresses the obstacle avoidance control.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions are provided for illustration only and not for the purpose of limiting the inventions as defined by the appended claims and their equivalents.

Figure 1:
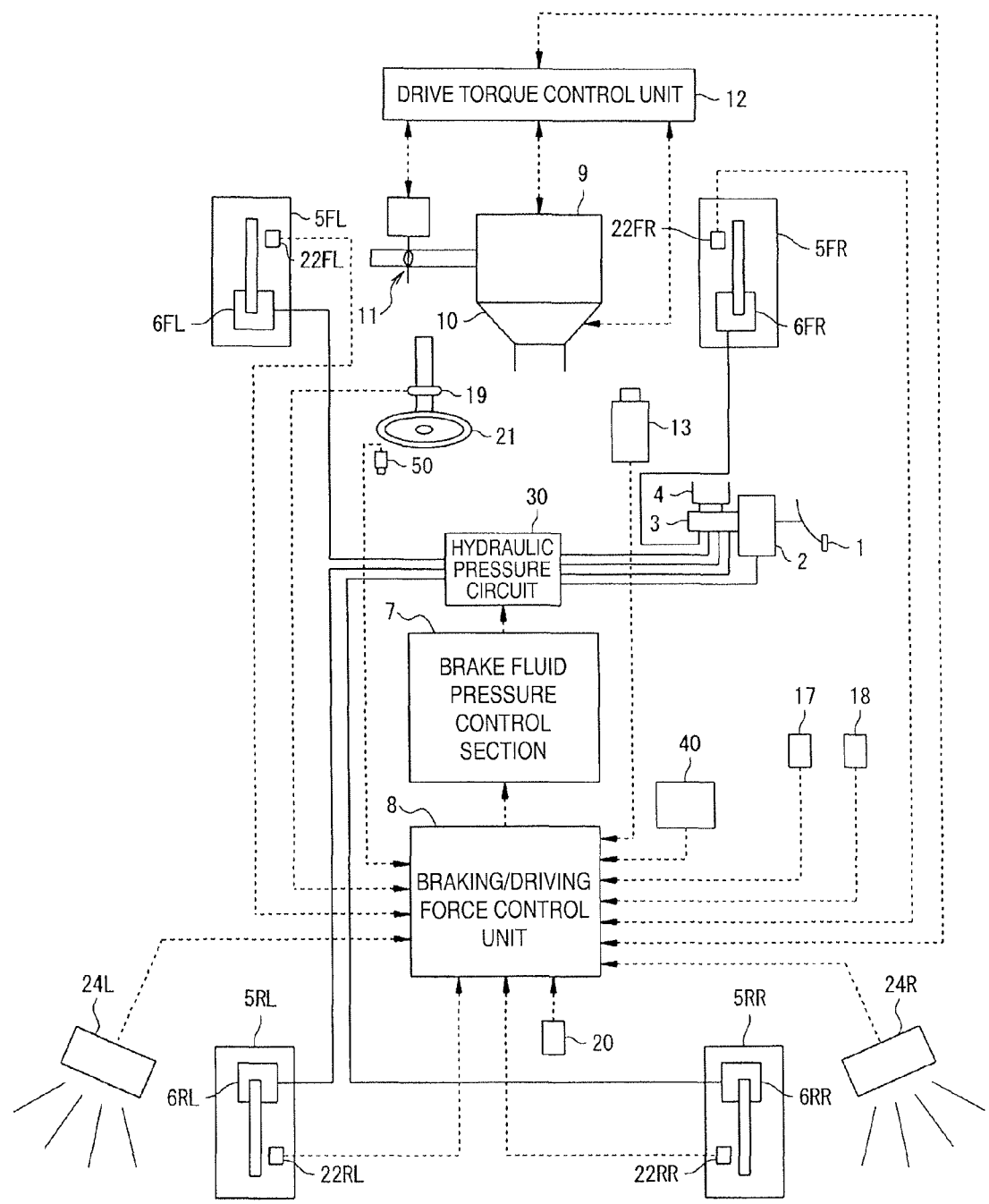
FIG. 1 is a schematic view of a vehicle driving control apparatus in accordance with a first embodiment.

Referring initially to FIG. 1, a vehicle driving control apparatus is illustrated in accordance with a first embodiment. This embodiment exemplifies a case in which the vehicle driving control apparatus is installed in a host vehicle with rear wheel drive. It would also be acceptable if the vehicle were a front wheel drive vehicle or a four wheel drive vehicle. The host vehicle has an automatic transmission and a differential gear. The host vehicle is also installed with a brake apparatus that can independently control the respective braking forces of the wheels, between front and rear wheels and between left and right wheels.

The host vehicle is provided with a braking system including, among other things, a brake pedal 1, a booster 2, a master cylinder 3 and a reservoir 4. The brake pedal 1 is connected to the master cylinder 3 through the booster 2. The host vehicle also has wheels 5FL to 5RR that are provided with wheel cylinders 6FL to 6RR, respectively. The master cylinder 3 is connected to each of the wheel cylinders 6FL to 6RR of the wheels 5FL to 5RR through a hydraulic pressure circuit 30. Thus, when braking control is not operating, the master cylinder 3 increases the brake fluid pressure in response to an amount by which the brake pedal 1 is depressed by the driver. The increased brake fluid pressure is transmitted through the hydraulic pressure circuit 30 and supplied to the wheel cylinders 6FL to 6RR of the wheels 5FL to 5RR.

A brake fluid pressure control section 7 controls actuators in the hydraulic pressure circuit 30 so as to control the brake fluid pressure of each of the wheel cylinders 6FL to 6RR of the wheels 5FL to 5RR separately. The brake fluid pressure supplied to each of the wheel cylinders 6FL to 6RR of the wheels 5FL to 5RR is controlled to a value corresponding to a command value from a braking/driving force control unit 8. The actuators are, for example, proportional solenoids arranged such that they can control a reduction pressure of each of the wheel cylinders to any desired brake fluid pressure.

A brake fluid pressure control section used in an anti-skid control system (ABS), a traction control system (TCS), or a vehicle dynamic control system (VDC) can be used to realize the brake fluid pressure control section 7 and the hydraulic pressure circuit 30. The brake fluid pressure control section 7 can also be configured to control the brake fluid pressure of each of the wheel cylinders 6FL to 6RR separately and independently. In such a case, when a brake fluid pressure command value is issued from the braking/driving force control unit 8 (described later), the brake fluid pressure of each of the wheel cylinders 6FL to 6RR of the wheels 5FL to 5RR is controlled according to the brake fluid pressure command value.

A drive torque control unit 12 is provided in the vehicle. The drive torque control unit 12 controls a drive torque imparted to the drive wheels, i.e., the rear wheels 5RL and 5RR. The drive torque control is accomplished by controlling an operating state of an engine 9, a selected gear ratio of the automatic transmission 10, and an opening degree of a throttle valve 11. In other words, the drive torque control unit 12 controls a fuel injection quantity and an ignition timing while simultaneously controlling a throttle opening degree. In this way, the operating state of the engine 9 is controlled.

The drive torque control unit 12 sends a drive torque value Tw to the braking/driving force control unit 8 as control information. The drive torque control unit 12 can also control the drive torques of the rear wheels 5RL and 5RR independently. However, when a drive torque command value is received from the braking/driving force control unit 8, the drive torque control unit 12 controls the torques of the drive wheels 5RL and 5RR in accordance with the drive torque command value.

An imaging section 13 having an image processing function is provided on a front portion of the host vehicle. The imaging section 13 is used to detect a position of the host vehicle within a lane in which it is traveling. The imaging section 13 is a monocular camera, e.g., a CCD (charged coupled device) camera. The imaging section 13 photographs or records images of a region in front of the host vehicle. The imaging section 13 then applies an image processing to the photographed image in order to detect a lane marker (e.g., a white line dividing the lanes), and thus detect the lane in which the vehicle is traveling based on the detected lane marker.

Based on the detected traveling lane, the imaging section 13 calculates a yaw angle $\phi$ front between a longitudinal axis of the host vehicle and the lane marker of the traveling lane, a transverse displacement amount Xfront with respect to the traveling lane, a curvature amount $\beta$ of the traveling lane, and a width of the traveling lane. The imaging section 13 then sends the calculated yaw angle $\phi$ front, the transverse displacement amount Xfront, the lane curvature amount $\beta$ and the lane width to the braking/driving force control unit 8. The imaging section 13 detects the lane marker and calculates the yaw angle $\phi$ front based on the detected lane maker. Thus, the yaw angle $\phi$ front is greatly affected by the accuracy with which the imaging section 13 detects the lane marker. The traveling lane curvature amount $\beta$ can also be calculated based on a steering angle $\delta$ of a steering wheel 21 (described later).

The host vehicle is provided with a pair of radar devices 24L and 24R. The radar devices 24L and 24R serve as sensors for detecting obstacles traveling on the left and right sides, respectively, of the vehicle. Each of the radar devices 24L and 24R is set such that it can detect if an obstacle exists within the region located laterally of the vehicle, this region including at least a prescribed blind spot area. Preferably, a relative transverse position POSXobst, a relative longitudinal position DISTobst, and a relative longitudinal velocity dDISTobst of the vehicle can be detected with respect to an obstacle on the left or right side of the host vehicle.

The host vehicle is provided with a master cylinder pressure sensor 17, an accelerator position sensor 18, a steering angle sensor 19, a turn signal switch 20, and wheel speed sensors 22FL to 22RR. The master cylinder pressure sensor 17 serves to detect an output pressure of the master cylinder 3, i.e., a master cylinder fluid pressure Pm. The accelerator position sensor 18 serves to detect a depression amount of an accelerator pedal, i.e., an accelerator position $\theta t$. The steering angle sensor 19 serves to detect a steering angle of the steering wheel 21. The turn signal switch 20 serves to detect a turning direction indicating operation of a turn signal device. Each of the wheel speed sensors 22FL to 22RR serve to detect a rotational speed, called a wheel speed Vwi (i=fl, fr, rl, rr), of a respective wheel 5FL to 5RR. Each of these sensors 22FL to 22RR sends a signal indicating a detected value to the braking/driving force control unit 8.

The host vehicle is also preferably provided with a navigation system 40. The navigation system 40 provides road information, as well as route information determined based on a destination set by a driver, to the braking/driving force control unit 8. The host vehicle is also provided with an imaging device 50 having an image processing function. The imaging device 50 is used to detect a viewing direction of a driver. The imaging device 50 is a monocular camera, e.g., a CCD (charged coupled device) camera. The imaging device 50 is arranged to photograph or record a portion of a driver's face. The imaging device 50 is further configured to process the photographed image of the driver's face and detect a viewing direction of the driver. It is acceptable to detect the direction in which the driver is facing as the viewing direction of the driver. The imaging device 50 sends information indicating the detected viewing direction of the driver to the braking/driving force control unit 8.

Figure 2:
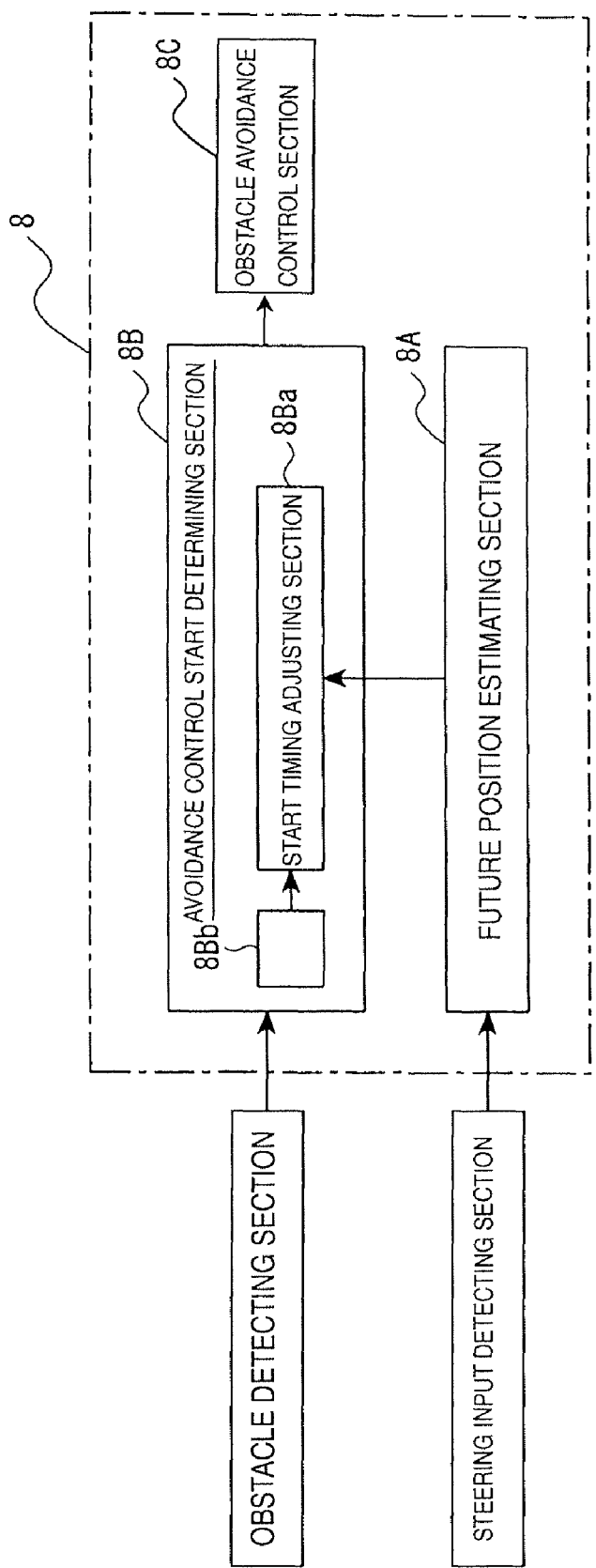
FIG. 2 is a block diagram showing constituent features of a control unit of the vehicle driving control apparatus in accordance with the first embodiment.

As shown in FIG. 2, the braking/driving force control unit 8 includes a future position estimating section 8A, an avoidance control start determining section 8B, and an obstacle avoidance control section 8C. The avoidance control start determining section 8B includes a lane change intent detecting section 8Bb and a start timing adjusting section 8Ba. The braking/driving force control unit 8 is operatively coupled to the braking system. The braking/driving force control unit 8 preferably includes a microcomputer with a braking/driving force control program that controls the braking system as discussed above. The braking/driving force control unit 8 can also include other conventional components such as an input interface circuit, an output interface circuit, and storage devices such as a ROM (Read Only Memory) device and a RAM (Random Access Memory) device. The microcomputer of the braking/driving force control unit 8 is programmed to control the braking system. The memory circuit stores processing results and control programs that are run by the processor circuit. The internal RAM of the braking/driving force control unit 8 stores statuses of operational flags and various control data. The internal ROM of the braking/driving force control unit 8 stores the programs for controlling various operations relating to the control of the braking/driving force. It will be apparent to those skilled in the art from this disclosure that the precise structure and algorithms for the braking/driving force control unit 8 can be any combination of hardware and software that will carry out the functions of the vehicle driving control apparatus.

Based on a steering input from a driver, the future position estimating section 8A estimates a future position where the host vehicle MM will be after a prescribed amount of time, i.e., a future viewing time Tt. The future viewing time Tt is used as a reference point in time for the host vehicle at which the avoidance control start determining section 8B will determine whether or not to start avoidance control. If it has been determined that an obstacle is detected in a region located laterally of the host vehicle MM, as defined above, then the avoidance control start determining section 8B determines the need for starting avoidance control when the estimated future position (future transverse position) of the host vehicle MM reaches a prescribed reference position (prescribed transverse position) with respect to a detected obstacle. When the avoidance control start determining section 8B determines the need for starting avoidance control, the obstacle avoidance control section 8C calculates a yaw moment Ms for controlling the host vehicle MM such that the host vehicle MM is prevented from encountering the detected obstacle SM.

The lane change intent detecting section 8Bb serves to detect an intent of the driver to change lanes and the direction of the intended lane change. The start timing adjusting section 8Ba is configured such that when the lane change intent detecting section 8Bb has detected that the driver intends to change to an adjacent lane on the opposite side of the detected obstacle, the start timing adjusting section 8Ba suppresses the obstacle avoidance control. This is in comparison with a situation in which the lane change intent detecting section 8Bb has detected that the driver intends to change to an adjacent lane in which the obstacle resides. In the former situation, the start timing adjusting section 8Ba suppresses the avoidance control by, for example, shortening the future viewing time Tt. When the future viewing time Tt is shortened, the estimated future position is altered such that it is not possible for the avoidance control start determining section 8B to make a positive detection of the need for avoidance control to start. The start timing adjusting section 8Ba can also suppress the avoidance control by reducing a target yaw moment Ms.

The processing executed by the braking/driving force control unit 8 will now be explained with reference to FIG. 3. The braking/driving force control unit 8 executes the processing with a timer interrupt each time a prescribed sampling time ΔT (e.g., 10 msec) elapses. Although the processing shown in FIG. 3 does not include communication processing, information acquired from computational processing steps is consecutively updated in a storage device, and necessary information is read from the storage device as needed.

Figure 3:
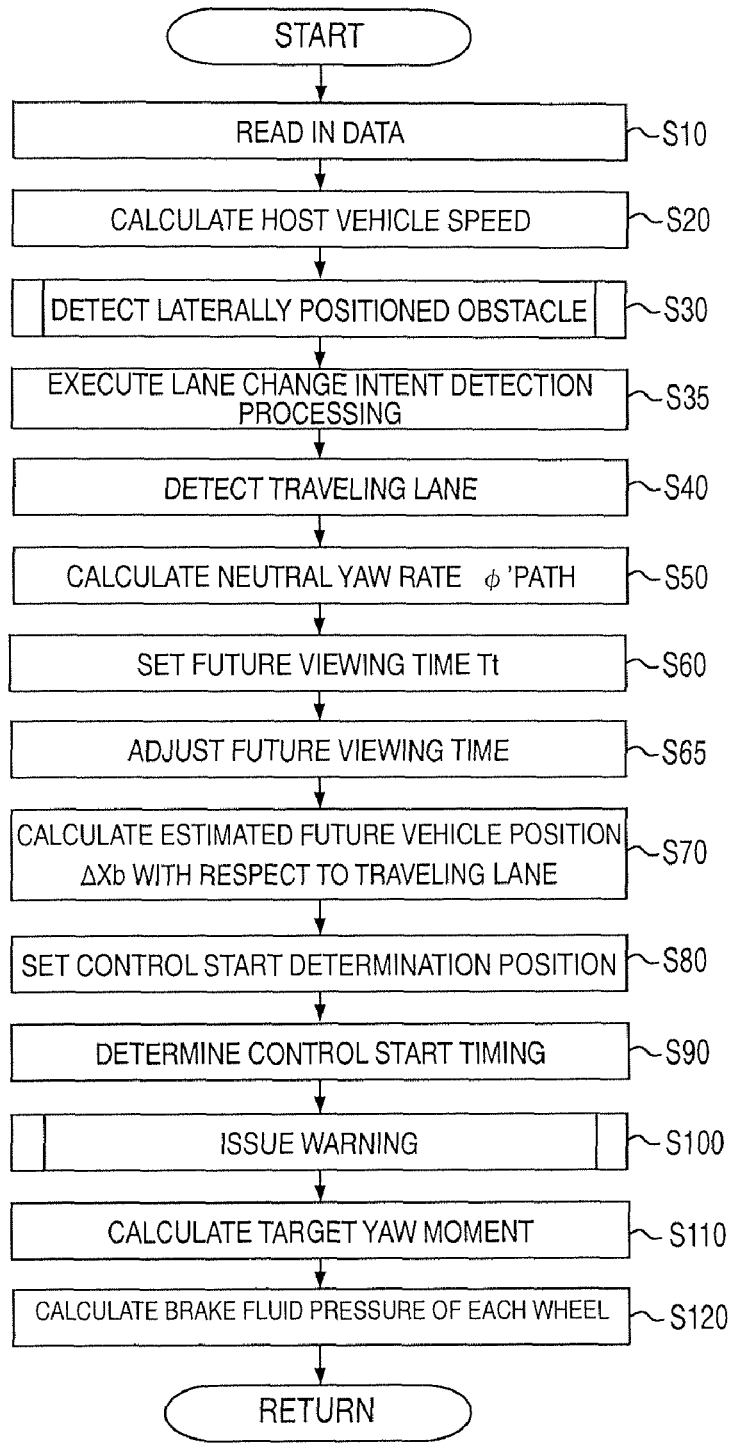
FIG. 3 is a flowchart showing control steps executed by the control unit in accordance with the first embodiment.

Referring now to FIG. 3, in step S10 the braking/driving force control unit 8 reads various data from the aforementioned sensors, controllers, and control units. More specifically, it acquires wheel speeds Vwi (including four wheel speeds corresponding to the front and rear wheels, Vwrl, Vwrr, Vwfl, Vwfr), a steering angle δ, a master cylinder fluid pressure Pm detected by the sensors, and a turn signal switch signal.

In step S20, the braking/driving force control unit 8 calculates a vehicle speed V. The vehicle speed V is calculated using one of the equations (1) shown below, depending on which wheels are the drive wheels.

$$V=(Vwrl+Vwrr)/2 \text{ (for front wheel drive);}$$

$$V=(Vwfl+Vwfr)/2 \text{ (for rear wheel drive)} \quad (1)$$

In the equations (1), Vwfl is the wheel speed of the left front wheel and Vwfr is the wheel speed of the right front wheel. Similarly, Vwrl is the wheel speed of the left rear wheel and Vwrr is the wheel speed of the right rear wheel. The equations (1) calculate the vehicle speed V as the average value of the wheel speeds of the non-drive wheels. In this embodiment, the vehicle speed V is calculated based on the wheel speeds of the front wheels (i.e., the latter equation) because the vehicle is a rear wheel drive vehicle. When a separate automatic braking control system, e.g., an ABS (anti-lock brake system), is operating, an estimated vehicle body speed estimated by the separate braking control system is acquired and used as the vehicle speed V.

Figure 4:
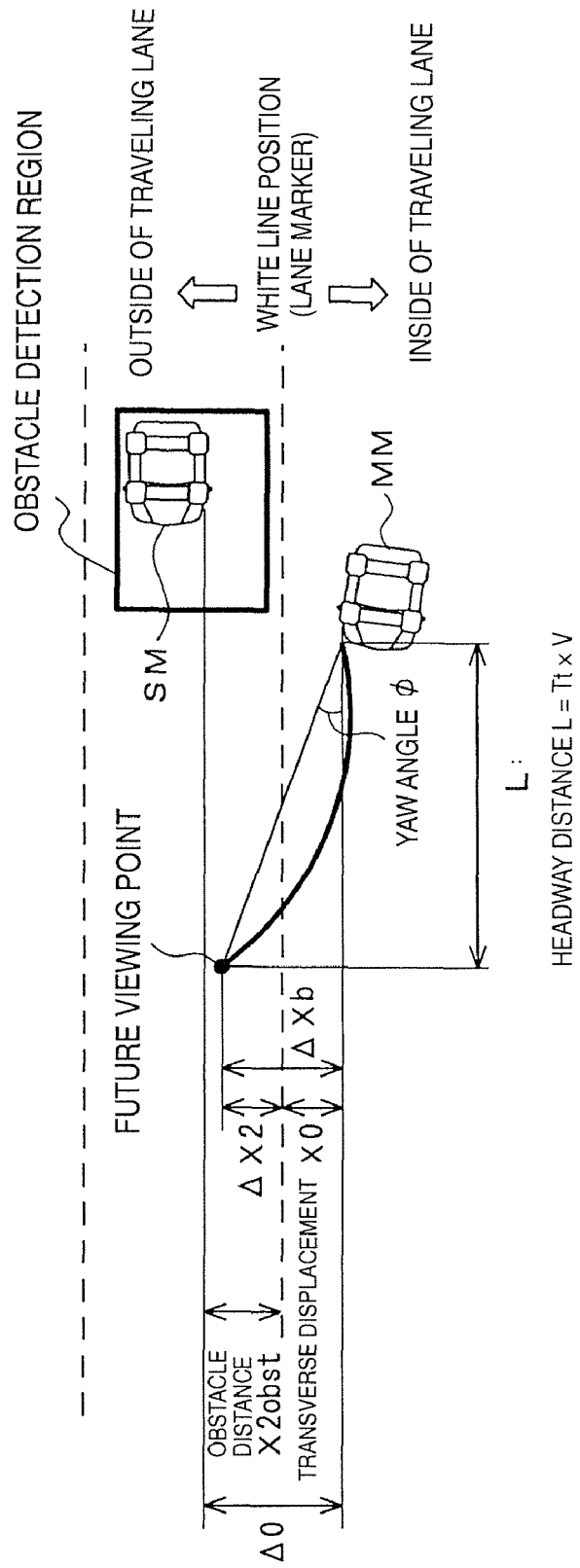
FIG. 4 is a conceptual diagram illustrating a relationship between a host vehicle employing the vehicle driving control apparatus and an obstacle (e.g., another vehicle)

In step S30, the braking/driving force control unit 8 determines the existence Lobst (i.e., existence or nonexistence) of an obstacle SM in a region laterally leftward of the vehicle MM and the existence Robst (i.e., existence or nonexistence) of an obstacle SM in a region laterally rightward of the vehicle MM. If more accurate sensors are used, then a relative position and relative velocity of obstacle(s) SM with respect to the vehicle MM can be obtained. As shown in FIG. 4, a lateral region of the vehicle MM in which an obstacle is detected includes positions diagonally rearward of the vehicle MM.

Figure 5:
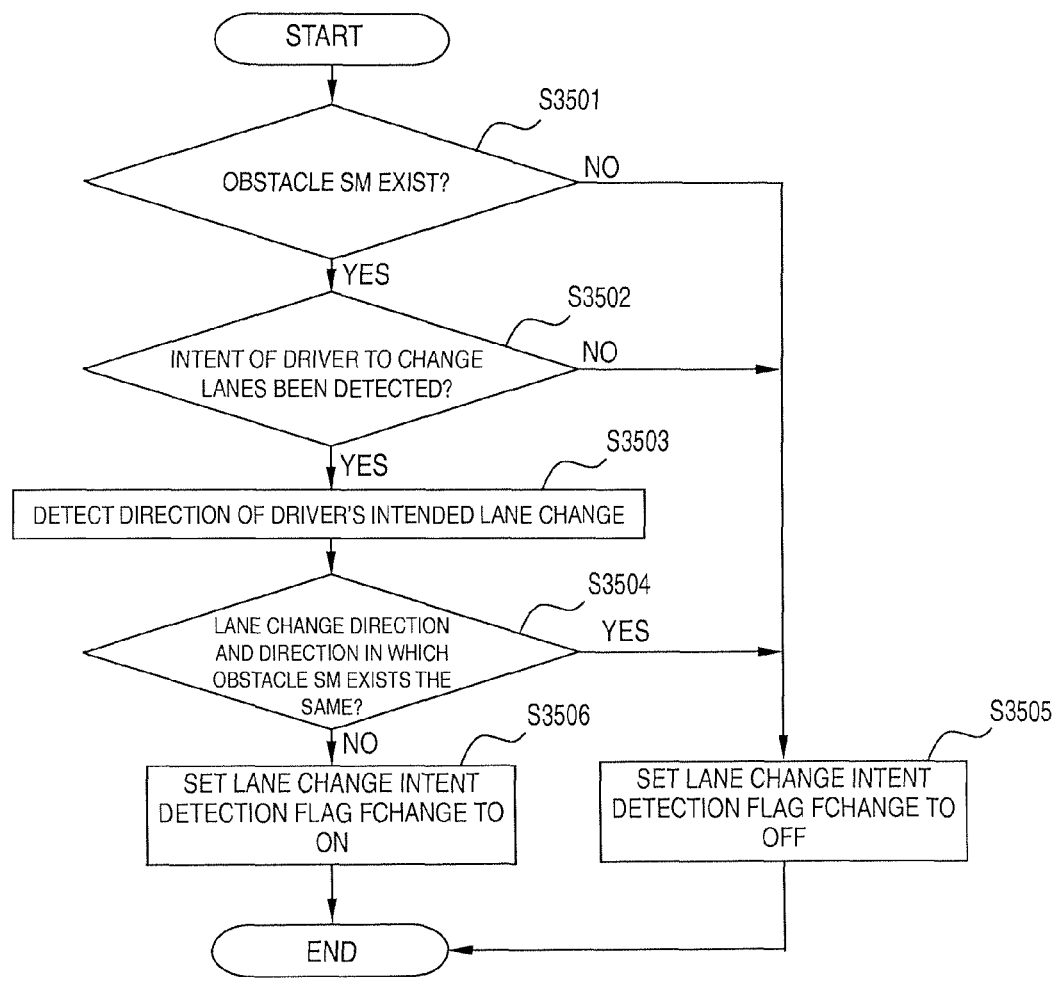
FIG. 5 is a flowchart showing processing steps executed by the control unit in performing a lane change intent detecting control.

In step S35, the braking/driving force control unit 8 executes a lane change intent detection processing to detect if the driver intends to change to an adjacent lane located on the opposite side of the vehicle MM as an obstacle SM. This lane change intent detection processing is shown in FIG. 5. In step S3501, the braking/driving force control unit 8 determines the existence Lobst of an obstacle SM on the left and the existence Robst of an obstacle SM on the right. If an obstacle exists on neither the left nor the right side of the vehicle, then the braking/driving force control unit 8 proceeds to step S3505. If an obstacle SM exists on at least one of the left and right sides, then the braking/driving force control unit 8 proceeds to step S3502.

In step S3502, the braking/driving force control unit 8 determines whether the driver intends to change lanes to an adjacent lane. In this embodiment, a driver's intent to change lanes and the direction in which the driver intends to change lanes are detected based on a signal from the turn signal switch 20. If the turn signal device has not been operated, then the braking/driving force control unit 8 determines that the driver does not intend to change lanes. If the driver does not intend to change lanes, then the braking/driving force control unit 8 proceeds to step S3505.

Conversely, if the turn signal device has been operated, then the braking/driving force control unit 8 determines that the driver does intend to change lanes. If it has been determined that such an intent exists, then the braking/driving force control unit 8 proceeds to step S3503.

In step S3503, the braking/driving force control unit 8 detects the direction of the lane change intended by the driver based on a signal from the turn signal switch 20 and proceeds to step S3504.

In step S3504, the braking/driving force control unit 8 determines if the direction of the intended lane change detected in step S3503 is the same as the direction in which the obstacle SM exists. If the direction of the intended lane change and the direction in which the obstacle exists are the same, then the braking/driving force control unit 8 proceeds to step S3505. If on the other hand the direction of the intended lane change and the direction in which the obstacle exists are opposite, then the braking/driving force control unit 8 proceeds to step S3506.

In step S3505, the braking/driving force control unit 8 turns a lane change intent detection flag Fchange OFF and ends the control sequence. Alternatively, in step S3506, the braking/driving force control unit 8 turns a lane change intent detection flag Fchange ON and ends the control sequence. The lane change intent detecting section 8Bb then counts the amount of time that has elapsed since it was detected that the driver intends to change to an adjacent lane located on the opposite side of the vehicle as the obstacle SM.

In step S40, from the imaging section 13, the braking/driving force control unit 8 reads a current transverse displacement amount Xfront of the vehicle MM with respect to the lane in which the vehicle is traveling (traveling lane) and a curvature amount βfront of the lane in which it is traveling. The curvature βfront of the traveling lane does not necessarily have to be acquired from the imaging section 13. For example, it is acceptable to acquire curvature information recorded in the navigation system 40 corresponding to the current position of the vehicle.

The braking/driving force control unit 8 calculates a yaw angle φ front of the vehicle MM with respect to the lane in which it is traveling. The yaw angle φ front is used to detect a traveling state within the lane. In this embodiment, a value measured by the imaging section 13 is used as the yaw angle φ front. It is also acceptable to calculate the yaw angle φ front based on a lane marker in an area photographed by the imaging section 13. In such a case, the yaw angle φ front can be calculated, for example, using the equation (2) shown below based on a change amount dX of the transverse displacement amount Xfront of the vehicle MM.

$$\varphi\,\text{front} = \tan^{-1}(dX'/V(=dX/dY)) \quad (2)$$

The components of the equation are as follows:
dX: change amount per time unit of the transverse displacement Xfront.
dY: change amount per time unit of a moving direction, and
dX': differential value of the change amount dX.

When the yaw angle φ front is calculated based on a nearby lane marker, the calculation of the yaw angle φ front is not limited to using the transverse displacement Xfront as shown in the equation (2) above. For example, it is acceptable to extend the detected lane marker to a far point and calculate the yaw angle φ front based on the extended lane marker.

In step S50, the braking/driving force control unit 8 calculates a neutral yaw rate φ'path. The neutral yaw rate φ'path is calculated with the equation (3) shown below.

$$\varphi'\text{path} = \text{front} \times V \quad (3)$$

The neutral yaw rate φ'path is a yaw rate necessary for the vehicle MM to maintain its travel along the lane in which it is traveling. The neutral yaw rate φ'path is zero when the vehicle is traveling along a straight path, but the neutral rate φ'path changes depending on the curvature βfront when the road is curved. Therefore, the curvature βfront of the lane in which the vehicle is traveling is used when calculating the neutral yaw rate φ'path.

To obtain a neutral yaw rate φ'path for maintaining the path along which the vehicle is traveling, it is also acceptable to use an average value φ'ave of a yaw rate φ' over a prescribed period of time or to perform a simple calculation of a value obtained by applying a filter having a large time constant to a yaw rate φ'.

In step S60, the braking/driving force control unit 8 sets a future viewing time Tt. The future viewing time Tt is an amount of time used to determine a threshold value for estimating a future proximity situation between the host vehicle MM having the braking/driving force control unit 8 and an obstacle SM. In other words, the future viewing time Tt indicates a point in time at which the avoidance control start determining section 8B will determine whether or not to start avoidance control. The future viewing time Tt is set to, for example, one second. The braking/driving force control unit 8 also calculates a target yaw rate Ψdriver and a target yaw rate Ψdriverhosei. The target yaw rate Ψdriver is calculated based on a steering angle δ and a vehicle speed V using the equation Ψdriver=Kv×δ×V. The target yaw rate Ψdriver is a target yaw rate generated in response to the steering. Kv is indicative of a gain value, as explained further below.

The target yaw rate Ψdriverhosei is calculated with the equation (4) shown below. The target yaw rate Ψdriverhosei is a value obtained by subtracting the yaw rate φ'path necessary to travel in the traveling lane from the target yaw rate Ψdriver. In this way, the effect of any steering performed in order to drive through a curve is eliminated.

$$\Psi\text{driverhosei} = \Psi\text{driver} - \varphi'\text{path} \quad (4)$$

In step S65, the braking/driving force control unit 8 adjusts the future viewing time Tt. The adjustment processing applied to the future viewing time Tt is selected according to the value of the lane change intent detection flag Fchange.

Presently the situation in which the lane change intent detection flag Fchange is OFF (S3505) will now be discussed. If, based on the lane change intent detection flag Fchange, the braking/driving force control unit 8 determines that it has not been detected that the driver intends to change to an adjacent lane on the opposite side of the vehicle as an obstacle SM, then the braking/driving force control unit 8 proceeds directly to step S70.

Figure 6:
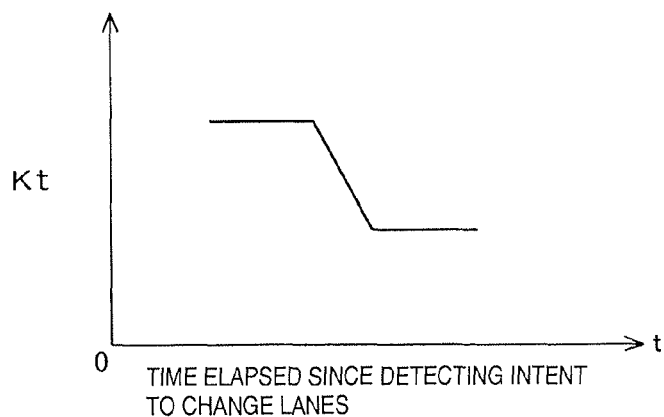
FIG. 6 is a graph showing the behavior of an adjusting gain Kt over time.

Conversely, in the situation in which the lane change intent detection flag Fchange is ON (S3506), the following process is executed by the braking/driving force control unit 8. If, based on the lane change intent detection flag Fchange, the braking/driving force control unit 8 determines that the driver intends to change to an adjacent lane on the opposite side of the vehicle as an obstacle SM, the braking/driving force control unit 8 adjusts the future viewing time Tt to a shorter amount of time using an adjusting gain Kt (Kt<1), thereby suppressing the avoidance control. The avoidance control is suppressed because the future viewing time Tt is a factor in determining estimated position ΔXb and the headway distance L, as discussed in detail below. The adjusting gain Kt can be set using a map like that shown in FIG. 6. More specifically, the adjusting gain Kt is set to decrease in accordance with the amount of time elapsed since it was detected that the driver intends to change to an adjacent lane located on the opposite side of the vehicle as the obstacle SM. As shown in the map of FIG. 6, the adjusting gain Kt remains at a prescribed value (<1) until the amount of time elapsed since it was detected that the driver intends to change to an adjacent lane located on the opposite side of the vehicle as the obstacle SM reaches a prescribed amount of time. After the prescribed amount of time has been reached, the adjusting gain Kt begins to decrease with the passage of time.

Figure 7:
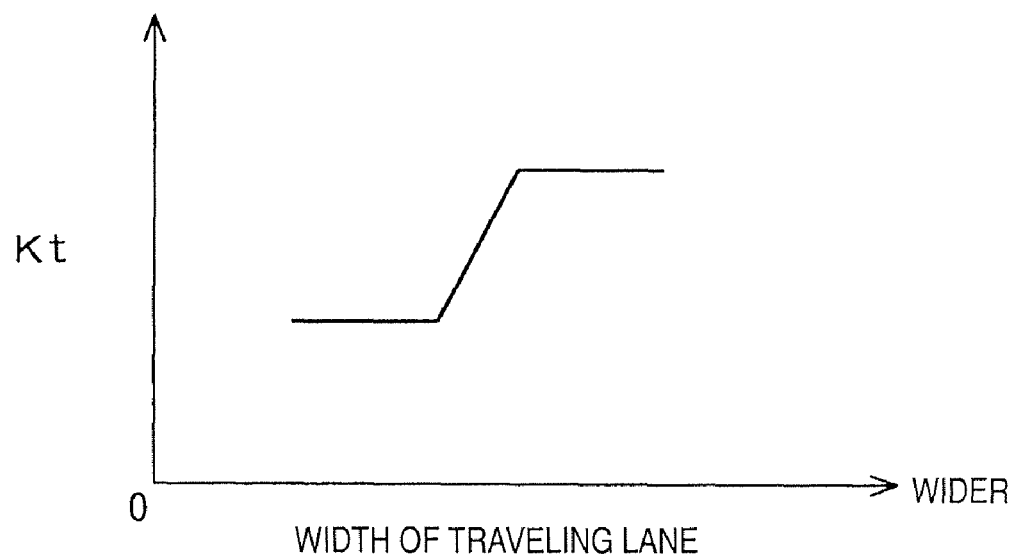
FIG. 7 is a graph showing the relationship between the adjusting gain Kt and the width of a driving lane.

It is also acceptable to set the adjusting gain Kt such that it decreases as the width of the traveling lane decreases, as shown in FIG. 7. With the map shown in FIG. 7, the adjusting gain Kt remains at a prescribed value while the width of the traveling lane is wider than a prescribed value. When the width of the traveling lane is narrower than the prescribed value, the adjusting gain Kt is set to be smaller in accordance with how narrow the traveling lane is. The future viewing time Tt is adjusted by using the following equation: Tt←Tt×Kt. Then, the braking/driving force control unit 8 proceeds to step S70.

The future viewing time Tt is adjusted separately for left and right lane markers. The future viewing time Tt corresponding to the appropriate adjacent lane marker is selected for use depending on whether an obstacle is on the left or right side of the vehicle. It is also acceptable to set the adjusting gain Kt such that it decreases in accordance with the amount of time elapsed since it was detected that the driver intends to change to an adjacent lane located on the opposite side of the vehicle as the obstacle SM, or such that it decreases in accordance with how narrow the traveling lane is. In such a case, the adjusting gain Kt can be revised by multiplying the adjusting gain Kt by a gain that is smaller than 1, thereby causing the adjusting gain Kt to decrease in accordance with the amount of time elapsed since it was detected that the driver intends to change to an adjacent lane located on the opposite side of the vehicle as the obstacle SM. In addition, the adjusting gain Kt can be revised by multiplying the adjusting gain Kt by a gain that is less than 1 and decreases in accordance with how narrow the traveling lane is.

In step S70, the braking/driving force control unit 8 calculates an estimated future position ΔXb of the vehicle in a transverse direction with respect to a current traveling lane position using the equation (5) below. The estimated future position ΔXb of the vehicle is used to determine if the vehicle will depart from the current lane to change lanes. In other words, the estimated future position ΔXb is used to determine whether or not to start the lateral obstacle avoidance control. In actual practice, the estimated future position ΔXb is calculated separately for the left and right sides.

$$\Delta Xb = (K1\phi + K2\phi m + K3\phi m') \quad (5)$$

The components of the equation (5) are as follows:
ϕ: yaw angle
ϕm: target yaw angle velocity
ϕm': target yaw angle acceleration The target yaw angle velocity ϕ m is determined by using the following equation: $\phi m = \Psi driverhosei \times Tt$.

The target yaw angle acceleration ϕm' is determined by using the following equation: $\phi m' = \phi m \times Tt^2$.

The estimated future position ΔXb can be expressed based on a headway distance L in order to express it in terms of a yaw angle by using the following equation:

$$\Delta Xb = L \times (k1\phi + k2\phi m \times T + k3\ \phi m' \times Tt^2).$$

The headway distance L and the future viewing time Tt are related as shown in the following equation: Headway distance L=future viewing time Tt×vehicle speed V. Thus, the value of the set gain K1 is a function of the vehicle speed, the value of the set gain K2 is a function of the vehicle speed and the future viewing time Tt, and the value of the set gain K3 is a function of the vehicle speed and the square of the future viewing time Tt. As shown in the equation ΔXb=max (K2ϕm, K3∫ϕm'), it is also acceptable to calculate an estimated position of the vehicle MM by separately finding a steering angle component and a steering velocity component and selecting the larger of the two components.

In step S80, the braking/driving force control unit 8 sets a control start determination threshold value. This determination threshold value is used to determine whether or not a lateral obstacle avoidance control will be started with respect to an obstacle SM located laterally of the host vehicle.

In this embodiment, the radar devices 24L and 24R detect a relative transverse distance ΔO between the vehicle MM and an obstacle SM. The relative transverse distance ΔO is set as the aforementioned determination threshold value (see FIG. 4).

When the transverse-direction relative distance ΔO between the host vehicle MM and an obstacle SM cannot be calculated accurately, an obstacle distance X2obst is set as the aforementioned determination threshold value (see FIG. 4). The obstacle distance X2obst is a prescribed value set in advance as a distance with respect to an imaginary obstacle SM. In other words, the control processing is executed as though the obstacle SM exists at a distance equal to the obstacle distance X2obst in an outward direction from the lane marker. It is acceptable to set the obstacle distance X2obst, i.e., the displacement from the lane marker to the imaginary obstacle SM, to 0. In such a case, the position of the lane marker and the position indicated by the obstacle distance X2obst are the same. Also in FIG. 4, a transverse distance X0 indicates a transverse distance between the host vehicle MM and the lane marker.

In this embodiment, an X-Y coordinate system is used in which a Y axis is oriented along the direction in which the traveling lane extends and an X axis is oriented along a direction perpendicular to the direction of the road, i.e., in a widthwise direction of the lane. A transverse position of the obstacle SM is detected as a coordinate on the X axis. The relative transverse distance ΔO is found based on this transverse position.

An obstacle detection region for detecting if an obstacle SM exists is set to span between prescribed longitudinal and transverse positions located laterally from the host vehicle MM. The longitudinal positions are set such that as the relative velocity at which the obstacle SM is approaching the host vehicle MM becomes larger, the obstacle detection region becomes larger.

In step S90, the braking/driving force control unit 8 executes a control start determination. First, the control unit 8 determines if there is an existence Lobst and/or Robst of an obstacle SM. If an obstacle exists on neither the left nor the right, the control unit sets an obstacle avoidance control determination flag Fout_obst to OFF and proceeds to step S100.

Meanwhile, if an obstacle SM exists on at least the left side or the right side, the control unit 8 determines if the equation ΔXb≧ΔO is satisfied on the side of the lane marker where the obstacle exists. If so, the control unit 8 determines that the obstacle avoidance control will be started. As shown in FIG. 4, the control unit 8 determines that a degree of risk with respect to an obstacle SM is high when the equation ΔXb≧ΔO is satisfied, i.e., when an estimated future position ΔXb of the vehicle MM indicates that the vehicle MM has closed the distance ΔO between the vehicle MM and the detected obstacle SM.

If an accurate distance ΔO between the vehicle MM and the detected obstacle SM cannot be obtained, then the determination is executed using the following equation: ΔX2=ΔXb−ΔX0≧X2obst, where ΔX0 is a transverse distance between the vehicle and the lane marker.

More specifically, as shown in FIG. 4, the braking/driving force control unit 8 determines if a transverse distance ΔX2 between the lane marker and an estimated future position of the vehicle MM is equal to or larger than the obstacle distance ΔX2obst. If the aforementioned condition is satisfied, then the braking/driving force control unit 8 determines that avoidance control will be started with respect to the obstacle SM because the degree of risk with respect to the obstacle SM is high. When it determines that control will be started with respect to the obstacle SM, the control unit 8 sets the obstacle avoidance control determination flag Fout_obst to ON. If the aforementioned condition is not satisfied, i.e., if the transverse distance ΔX2 between the lane marker and an estimated future position of the vehicle MM is smaller than the determination threshold value, then control unit 8 sets the obstacle avoidance control determination flag Fout_obst to OFF.

In actual practice, an estimated future position ΔXb is calculated separately for each of the left and right sides as a ΔXbL and a ΔXbR, and separate determinations are executed for the left and right sides. The obstacle SM targeted by this control is not limited to vehicles located laterally rearward of the vehicle MM. It can also apply to oncoming vehicles traveling in an adjacent lane. Regarding determining if the estimated future position ΔXb is smaller than the determination threshold value, it is acceptable to include a hysteresis factor F by amending the equations as ΔXb≧ΔO−F or ΔX2≧X2obst−F. In this way, a dead zone can be established in which the obstacle avoidance control is not performed. That is, a dead zone can be provided between a control start threshold value and a control end threshold value.

The flag Fout_obst can only be set to ON when the flag Fout_obst is OFF. It is also acceptable to add a time-related condition for allowing the flag Fout_obst to be turned ON, such as requiring a prescribed amount of time to have elapsed since the flag Fout_obst was last set to OFF. The control can also be configured such that, when a prescribed amount of time Tcontrol has elapsed since the flag Fout_obst was determined to be ON, the flag Fout_obst is turned OFF and the control ends.

During execution of the obstacle avoidance control, a control execution direction Dout_obst is determined based on a determined direction of an estimated future position of the host vehicle. Thus, the direction Dout_obst is set to LEFT (Dout_obst=LEFT) if the estimated future position is to the left, or to RIGHT (Dout_obst=RIGHT) if the estimated future position is to the right. If an anti-skid control system (ABS), a traction control system (TCS) or a vehicle dynamic control system (VDC) is operating, then the obstacle avoidance control determination flag Fout_obst is set to OFF. The flag Fout_obst is turned OFF when an automatic braking control is operating so that the obstacle avoidance control will not be executed.

This determination method accomplishes the same task as would be accomplished by setting a separate threshold value for each of the steering velocity δ', the steering angle δ, and the yaw angle φ in a direction oriented toward the obstacle SM and setting the threshold values such that the closer the host vehicle MM is to the obstacle SM, the more difficult it is to determine that it is time for an obstacle avoidance control to start. The reason the same task is accomplished is that the target yaw rate φ m' is found based on a steering angle and a vehicle speed in accordance with a publicly known and widely used method.

In step S100, the braking/driving force control unit 8 executes a control processing so as to issue a warning. In this embodiment, the braking/driving force control unit 8 issues a warning when it has determined in step S90 that a control start position (determination threshold value) has been reached. It is acceptable to perform the obstacle avoidance control such that the warning is issued before a headway point, which is based on the aforementioned future viewing time Tt, reaches a control start position. For example, a prescribed gain Kbuzz (Kbuzz>1) might be used to obtain a longer future viewing time Tt than the future viewing time Tt used in step S90 to detect an avoidance control start. Then, using the longer future viewing time Tt×Kbuzz in the equation (5) to calculate a headway point, a warning can be issued when the headway point is determined in step S90 to have reached the control start position. It is also acceptable to configure the control such that, when it is determined in step S90 that the obstacle avoidance system will be started, the avoidance control starts after a prescribed amount of time has elapsed.

In step S110, the braking/driving force control unit 8 sets a target yaw moment Ms. If the obstacle avoidance control determination flag Fout_obst is ON, then the target yaw moment Ms is calculated using the equation (6) as shown below. If the obstacle avoidance control determination flag Fout_obst is OFF, then the braking/driving force control unit 8 sets the target yaw moment Ms to 0 and proceeds to step S120. If the obstacle avoidance control determination flag Fout_obst is ON, then the braking/driving force control unit 8 calculates the target yaw moment Ms using the equation (6) shown below.

$$Ms = K1recv \times K2recv \times \Delta Xs \quad (6)$$

wherein, ΔXs=(K1mom×φ+K2mom×φm)

Figure 8:
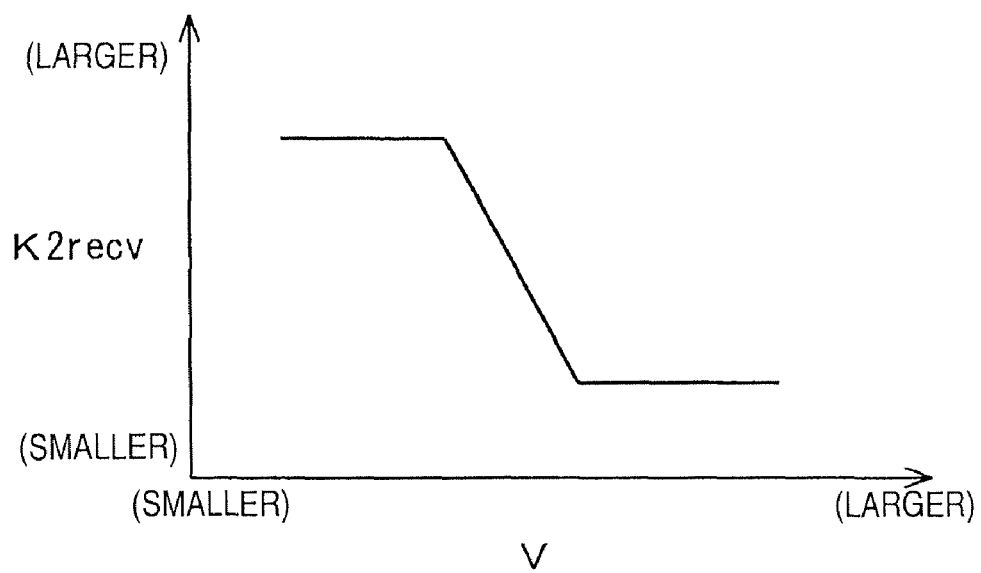
FIG. 8 is a graph showing the relationship between a gain K2recv and a vehicle speed V.

The gain K1recv is a proportional gain (yaw inertial moment) determined based on the vehicle specifications. The gain K2recv is a gain that varies according to the vehicle speed V. An example illustrating the gain K2recv is shown in FIG. 8. As shown in FIG. 8, the gain K2recv has a large value in a low speed region and decreases inversely proportionally with respect to the vehicle speed after the vehicle speed reaches a certain value. After the vehicle speed V reaches another certain value, the gain K2recv remains fixed at a small value. The value of the set gain K1mom is a function of the vehicle speed, and the value of the set gain K2mom is function of the vehicle speed and the future viewing time Tt.

According to the equation (6), the larger a yaw angle φ with respect to a white line and a steady yaw rate occurring due to the driver cutting the steering wheel are, the larger the target yaw moment Ms becomes.

It is also acceptable to calculate the target yaw moment Ms using the equation (7) shown below. The equation (7) is equivalent to multiplying the expression shown in the equation (6) by a gain K3(=1/Tt²). The gain K3 decreases as the future viewing time Tt increases.

$$Ms = K1recv \times \Delta Xb/(L \times Tt^2) \quad (7)$$

The equation (7) reflects a control time T indicating how long the yaw angle will be controlled. Thus, by configuring the control such that the control time T and the future viewing time Tt are equal, the time T required to return the vehicle is shorter when the future viewing time Tt is shorter. As a result, the control effect (amount) is stronger. Consequently, even if the control is configured such that the control start timing is late, the amount of control imposed when the control starts is larger. Meanwhile, the amount of control imposed is smaller when the control start timing is set to occur earlier. As a result, the control can be executed in accordance with the situation without regard to the headway point set with respect to the driver such that the driver experiences less of a feeling that something is odd about the vehicle.

The determination of the value of the flag Fout_obst serves to estimate a future change of the path of the vehicle based on steering information.

Instead of configuring the control as described heretofore, if the vehicle includes a lane departure prevention control, then is it also acceptable to configure the controls such that when one of the controls (i.e., either the control of this embodiment or the lane departure prevention control) is started before the other, the control started first is given priority and the other is not executed until the first has ended.

In step S120, the braking/driving force control unit 8 calculates a command for generating a target yaw moment Ms for avoiding the obstacle. After sending the calculated command, the control unit 8 returns to the start of the control sequence. An example in which a yaw rate Ms calculated according to this embodiment for avoiding an obstacle is generated by using braking and driving forces to produce a yaw moment will now be explained. If a steering reaction force control apparatus is used to generate the yaw rate, then a steering reaction force Frstr is produced according to the following equation: Frstr=K×Ms.

If a steering control apparatus is used to generate the yaw rate, then a steering angle STRθ produced according to the equation STRθ=K×Ms' is applied to the steering. It is also acceptable to use a steering control apparatus to generate the yaw rate by generating a steering force (steering torque) STRtrg given by STRtrg=K×Ms.

When the target yaw moment Ms is 0, i.e., when it is determined that a condition(s) is (are) such that a yaw moment control will not be executed, a target brake fluid pressure Psi (i=fl, fr, rl, rr) of each of the wheels is set to a brake fluid pressure Pmf.

$$Psfl = Psfr = Pmf \quad (8)$$

$$Psrl = Psrr = Pmr \quad (9)$$

The pressure Pmf is a brake fluid pressure for the front wheels. The pressure Pmr is a brake fluid pressure for the rear wheels and is a value calculated based on the brake fluid pressure Pmf for the front wheels in accordance with a distribution between front and rear. For example, if a driver is operating a brake, then the brake fluid pressures Pmf and Pmr are set to values corresponding to a brake operation amount (master cylinder fluid pressure Pm).

Meanwhile, if the absolute value of the target moment Ms is larger than 0, i.e., if it has been determined that an obstacle avoidance control will be started, then the following control processing is executed. Based on the target yaw moment Ms, a front wheel target brake fluid pressure difference ΔPsf and a rear wheel target brake fluid pressure difference ΔPsr are calculated. More specifically, the target brake fluid pressure differences ΔPsf and ΔPsr are calculated according to the equations (10) and (11) shown below.

$$\Delta Psf = 2 \times Kbf \times (Ms \times FRratio)/Tr \quad (10)$$

$$\Delta Psf = 2 \times Kbr \times (Ms \times (1-FRratio))/Tr \quad (11)$$

The components of the equations are as follows:
FRratio: setting threshold value,
Tr: tread, and
Kbf and Kbr: conversion coefficients for converting a braking force into a brake fluid pressure for the front wheels and rear wheels.

In this example, the value of the tread Tr is assumed to be the same for both the front and the rear for convenience. Kbf and Kbr are determined based on brake specifications.

The distribution of the braking forces generated at the wheels is determined according to the magnitude of the target yaw moment Ms. In other words, a prescribed value is given to each of the target brake fluid pressure differences ΔPsf and ΔPsr such that a braking force difference occurs between the left and right front wheels and between the left and right rear wheels, respectively. The calculated target brake fluid pressure differences ΔPsf and ΔPsr are then used to calculate a final target brake fluid pressure Psi (i=fl, fr, rl, rr) of each wheel.

More specifically, if the control execution direction Dout_obst is set to LEFT, i.e., if the obstacle avoidance control is to be executed with respect to an obstacle on the left, the target brake fluid pressure Psi (i=fl, fr, rl, rr) is calculated for each of the wheels according to the equations (12) shown below.

$$Psfl = Pmf$$

$$Psfr = Pmf + \Delta Psf$$

$$Psrl = Pmr$$

$$Psrr = Pmr + \Delta Psr \quad (12)$$

If control execution direction Dout is set to RIGHT, i.e., if the vehicle exhibits a trend of departing from the lane with respect to a right-hand lane marker, the target brake fluid pressure Psi (i=fl, fr, rl, rr) is calculated for each of the wheels according to the equations (13) shown below.

$$Psfl = Pmf + APsf$$

$$Psfr = PmfPsrl = Pmr + \Delta Psr$$

$$Psrr = Pmf \quad (13)$$

With the equations (12) and (13), a braking/driving force difference is generated between left and right wheels such that the wheel braking forces are larger on the side where a lane departure is to be prevented. As shown in the equations (12) and (13), the target brake fluid pressures Psi (i=fl, fr, rl, rr) of the wheels are calculated so as to take into account a brake operation by the driver, i.e., the brake fluid pressures Pmf and Pmr. The braking/driving force control unit 8 sends the calculated target brake fluid pressures Psi (i=fl, fr, rl, rr) of the wheels as brake fluid pressure command values to the brake fluid pressure control section 7.

The estimated future position ΔXb serves as a future position where the vehicle will be after the future viewing time Tt has elapsed. The estimated future position ΔXb is calculated based on a yaw angle φ, a yaw angle velocity φm, and other parameters indicating a traveling state of the vehicle. If the estimated future position ΔXb is on the same side as a detected obstacle SM and equals or excels a distance ΔO between the vehicle MM and the detected obstacle SM, then a lateral obstacle avoidance control for avoiding the obstacle SM is started (see FIG. 4). When it has been determined that the control will be started, a target yaw moment Ms is calculated as a control quantity based on the estimated future position ΔXb and a braking/driving force control is executed such that the target yaw moment Ms is generated. In this way, the vehicle is controlled in such a direction that it is prevented from laterally approaching the obstacle.

Figure 9:
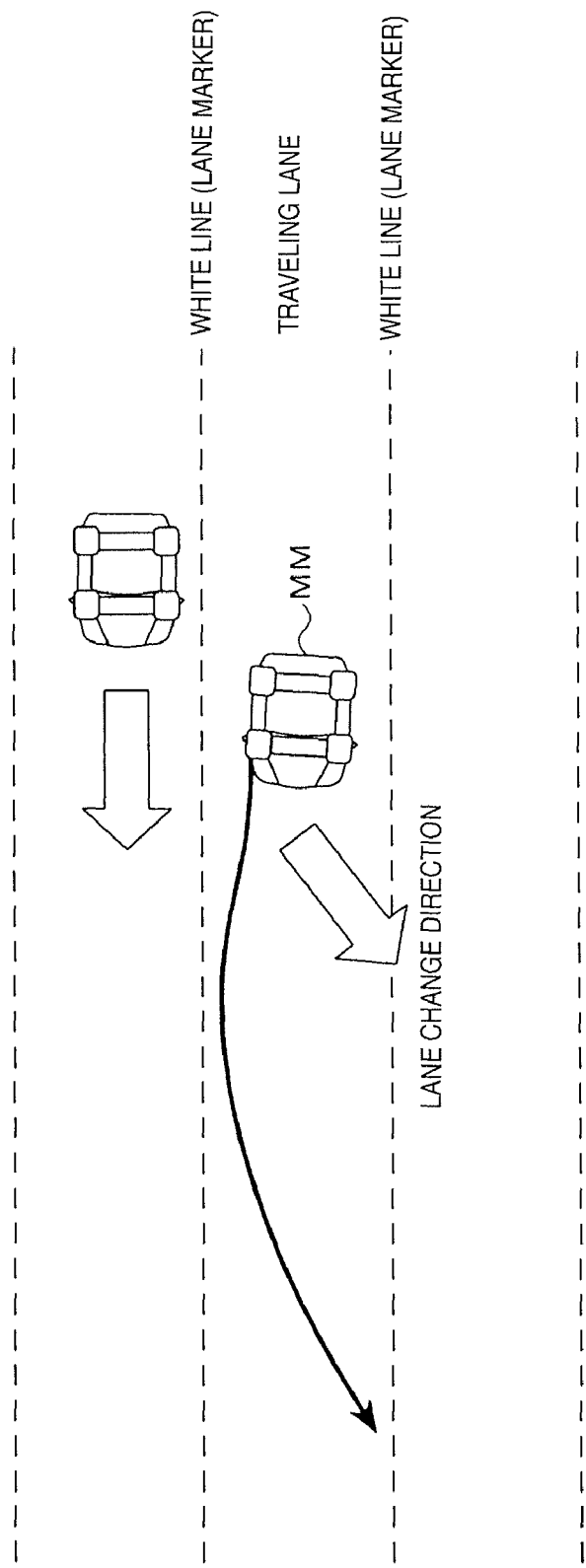
FIG. 9 is a diagram illustrating a preparatory operation (turning) performed by a driver.

As shown in FIG. 9, when a driver changes lanes, the driver will sometimes perform a preparatory operation in which the driver steers the vehicle in a direction opposite a direction of accomplishing the lane change before steering the vehicle in the direction of accomplishing the lane change. FIG. 9 shows a case in which a driver of the vehicle MM will change lanes into the adjacent lane located downward in the figure. In FIG. 9, the arrow curve indicates the movement of the vehicle resulting from the preparatory operation. In such a case, the driver will experience an odd feeling of resistance if a control for avoiding an obstacle is executed in response to the preparatory operation.

Therefore, when an obstacle SM is detected and it is detected that the driver intends to change to an adjacent lane located on the opposite side of the vehicle MM as the obstacle SM, a control serving to prevent the vehicle from laterally approaching the obstacle is suppressed. More specifically, the future viewing time Tt is adjusted to a shorter amount of time and the target yaw moment Ms is adjusted to a smaller value. In this way, an execution of the obstacle avoidance control beyond what is necessary can be prevented and the odd feeling experienced by the driver can be reduced.

When the width of a lane in which the vehicle is traveling is narrower, the obstacle avoidance control starts more readily because the transverse distance ΔX0 between the vehicle and a lane marker is smaller. Thus, the obstacle avoidance control tends to start more readily than necessary. Therefore, the narrower the width of the traveling lane is, the smaller is the value to which the future viewing time Tt is adjusted. In other words, the headway point is moved closer to the current position and it becomes more difficult for the obstacle avoidance control to start. By delaying the timing at which the obstacle avoidance control is started, the degree to which the obstacle avoidance control is suppressed increases. In this way, unnecessary starting of the obstacle avoidance control can be prevented and the odd feeling experienced by the driver can be reduced. Since the suppression of the obstacle avoidance control is accomplished by merely delaying the control start timing, control (obstacle avoidance control) is still executed with respect to a laterally located obstacle when necessary.

Thus, while executions of the obstacle avoidance control that cause the driver to experience an odd feeling are reduced, the obstacle avoidance control can be started when the driver deliberately steers toward an obstacle SM.

In this embodiment, the radar devices 24L and 24R constitute the obstacle detecting device. The future position estimating section 8A (step S70) constitutes the future position estimating device. The avoidance control start determining section 8B (steps S80 and S90) and the obstacle avoidance control section 8C (steps S100 to S120) constitute the obstacle avoidance control device. The lane change intent detecting section 8Bb (step S35) constitutes the lane change intent detecting device. The start timing adjusting section 8Ba (step S65) constitutes the control suppressing portion. The turn signal switch 20 constitutes the turn signal switch.

An obstacle avoidance control section calculates a degree of risk with respect to an obstacle based on an estimated future position of the vehicle in which the invention is employed. The vehicle is then controlled in accordance with the calculated degree of risk with respect to the obstacle such that the vehicle is prevented from laterally approaching the obstacle. The control suppressing portion is configured such that when it determines that the lane change intent detecting section has detected that the driver intends to change to an adjacent lane located on the opposite side of the vehicle as the side having a detected obstacle, the control suppressing portion suppresses the obstacle avoidance control in comparison with a situation in which the lane change intent detecting section has not detected that the driver intends to change to an adjacent lane located on the opposite side of the vehicle as the side having the obstacle.

Therefore, when an obstacle is detected and it is detected that the driver intends to change to an adjacent lane located on the opposite side of the vehicle as the obstacle, the obstacle avoidance control is suppressed. As a result, a necessary control can be executed with respect to an obstacle existing in a region located laterally of the vehicle, while also preventing the control from being executed beyond what is necessary. In short, an appropriate control can be executed with respect to a laterally positioned obstacle while reducing the control when necessary to avoid causing the driver to experience an odd feeling of resistance when the driver intends to turn away from the obstacle.

The control suppressing portion is configured to suppress the obstacle avoidance control by shortening a prescribed amount of time (as described above) used to estimate a future position of the vehicle. In this way, the obstacle avoidance control can be suppressed in a simple fashion.

The control suppressing portion is configured to suppress the obstacle avoidance control such that the narrower a lane in which the vehicle is traveling, the higher the degree to which the obstacle avoidance control is suppressed. When the width of the traveling lane is narrower, the obstacle avoidance control starts more readily because the transverse distance between the vehicle and a lane marker is smaller. Thus, the obstacle avoidance control tends to start more readily than necessary. Therefore, the suppression control is configured such that the obstacle avoidance control is started less readily when the width of the traveling lane is narrower. In this way, unnecessary starting of the obstacle avoidance control can be prevented and an odd feeling experienced by the driver can be reduced.

The control suppressing portion is configured to detect both an intent of a driver to change lanes and a direction of an intended lane change based on a turn signal operation detected by a turn signal switch. Thus, an intent of the driver to change lanes and the direction of an intended lane change are detected based on information clearly indicated by the driver. In this way, an intent of a driver to change lanes and the direction of an intended lane change can be detected.

In the previously described embodiment, a future viewing time Tt is adjusted by multiplying the future viewing time Tt by an adjusting gain Kt. In this way, a headway point is adjusted and a start timing of the obstacle avoidance control is adjusted. Additionally, by adjusting the headway point, a control quantity (target yaw moment Ms) used during execution of the control is also adjusted. Instead, it is acceptable to multiply the estimated future position ΔXb calculated in step S70 by the adjusting gain Kt. The resulting effects are the same. The estimated future position ΔXb is a value related to a transverse position of the headway point.

It is acceptable to adjust the start timing of the obstacle avoidance control and, thereby, suppress the obstacle avoidance control (which serves to prevent the vehicle from laterally approaching an obstacle) by multiplying the adjusting gain Kt by the estimated future position ΔXb, which is used as a condition for determining the start timing of the obstacle avoidance control in step S90. By adjusting the start timing of the obstacle avoidance control with the adjusting gain Kt in this manner, the control quantity (target yaw moment Ms) used during execution of the control is not affected by the adjusting gain Kt.

When, in step S90, the determination of when to start the obstacle avoidance control is based on whether or not a transverse position ΔX2 (estimated future position of the vehicle MM) with respect to a lane marker is equal to or larger than an obstacle distance ΔX2obst, it is acceptable to adjust the start timing of the obstacle avoidance control and, thereby, suppress the obstacle avoidance control (which serves to prevent the vehicle from laterally approaching an obstacle) by increasing the obstacle distance ΔX2obst.

In the previously described embodiment, the position of the headway point is adjusted by multiplying the future viewing time Tt or the estimated future position ΔXb by an adjusting gain Kt. Thus, the start timing of the obstacle avoidance control is adjusted by multiplying the entire value indicating the headway point by the adjusting gain Kt. A related equation is shown below, where Kt is the adjusting gain.

$$\Delta Xb = Kt \times (K1\phi + K2\phi m + K3\phi m')$$

Instead, it is acceptable to multiply each of the variables φ, φ m, and φ m' constituting ΔXb by a separate gain Kt, as shown in the equation below.

$$\Delta Xb = (Kta \times K1\phi + Ktb \times K2\phi m + Ktc \times K3\phi m')$$

Thus, the gains applied to each of φ, φ m, and φ m' can be adjusted separately. In this way, the control can be tailored to the conditions of a route along which the vehicle is traveling such that while executions of the obstacle avoidance control that cause the driver to experience an odd feeling are reduced, the obstacle avoidance control can be started when the driver deliberately steers toward an obstacle SM. For example, a control start timing adjusting section can be configured to adjust a steering angle component and a steering velocity component detected by a future traveling lane detecting section such that the steering angle component is adjusted by a larger amount.

It is possible for a steering operation performed by a driver to have been performed in order to steer the vehicle through a curve. Therefore, the gain applied to the steering angle component is lowered because it is highly probable that a situation will occur in which a leftward or rightward steering angle is held in a substantially steady state. As a result, the ability to detect a steering operation that includes a steering velocity and is part of an attempt to change lanes is maintained while alleviating the repeated occurrence of unnecessary execution of the obstacle avoidance control when the vehicle is traveling along a steady path.

Figure 10:
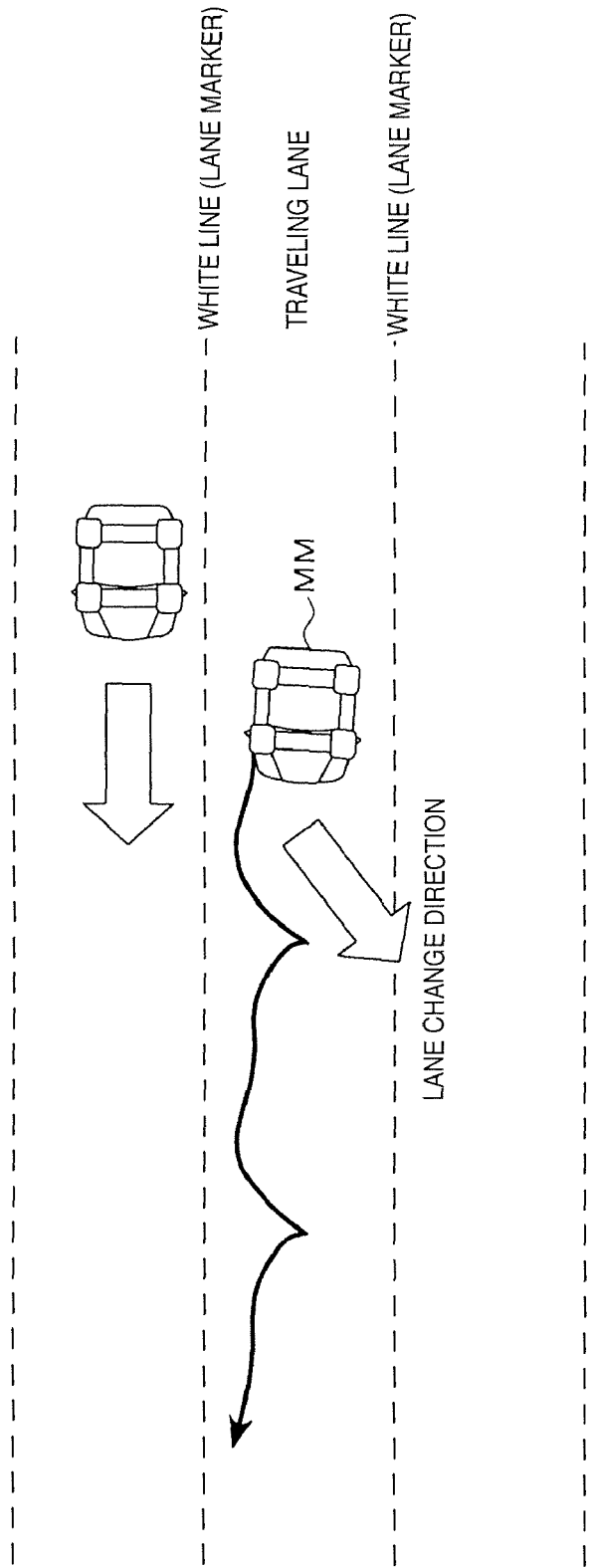
FIG. 10 is a diagram illustrating a driver turning the steering toward and away from an adjacent lane.

In the previously described embodiment, the lane change intent detecting section 8Bb detects an intent of a driver to change lanes and a direction in which the driver intends to change lanes based on a signal from the turn signal switch 20. Instead, it is acceptable for the lane change intent detecting section 8Bb to be configured to detect an intent of a driver to change lanes and a direction in which the driver intends to change lanes based on a steering input detected by the steering angle sensor 19. There are situations in which, as shown in FIG. 10, a driver intermittently turns the steering wheel toward an adjacent lane (steering operation) and then turns the steering wheel back toward the lane in which the vehicle is traveling during the process of changing lanes (steering return operation). FIG. 10 shows a case in which a driver of a vehicle MM will change lanes into the adjacent lane located downward in FIG. 10. In FIG. 10, the arrow curve indicates the movement of the vehicle resulting from the intermittent steering toward and away from the target lane. Therefore, the intent of the driver to change lanes and the direction in which the driver intends to change lanes is detected based on the turning of the steering wheel toward the target lane.

More specifically, a separate estimated future position ΔXb in a transverse direction is calculated for each of the left and right sides with respect to a current position of the vehicle in the lane in which it is traveling. A separate second threshold value ΔXdirection is also set with respect to each of the left and right estimated future positions ΔXb in the transverse direction. If it is determined that a calculated estimated future position ΔXb has reached a second threshold value ΔXdirection, then a time ΔTover required for the estimated future position ΔXb to reach ΔXdirection after the steering angle was changed from a neutral angle φ neutral is calculated using this equation: ΔTover=TΔXdirection−T φ neutral. The neutral steering angle φ neutral is a steering angle that is neutral with respect to the path of the vehicle.

If the calculated time ΔTover is within a prescribed amount of time (e.g., equal to or smaller than 0.5 second), then it is determined that the steering was toward an adjacent lane and a steering counter is incremented by 1. The steering counter also increments by 1 each time a prescribed amount of time has elapsed. When the value of the steering counter reaches a prescribed value (e.g., 2), it is determined that an intent of the driver to change lanes has been detected. Furthermore, the direction in which the driver intends to change lanes is determined to be the direction of a steering operation.

Additionally, based on a steering operation performed by the driver, the apparatus can determine if the driver intends to change to an adjacent lane located on the opposite side of the vehicle as an obstacle SM. It is also acceptable to detect an intent of the driver to change lanes and a direction of the intended lane change based on both a steering operation and a steering return operation. In such a case, a time ΔTrev required for the steering angle to return to a neutral angle Φneutral from a state in which the estimated future position ΔXb has reached ΔXdirection is calculated using the following equation: ΔTrev=T φ neutral−TΔXdirection.

If the calculated ΔTrev is within a prescribed amount of time (e.g., equal to or smaller than 0.5 second), then the steering counter is incremented by 1. The steering angle sensor 19 constitutes the steering input detecting device. Thus, by detecting an intent of the driver to change lanes and a direction of the intended lane change based on a steering input detected by the steering input detecting device, an intent of the driver to change lanes and a direction of the intended lane change can be estimated even when the intent of the driver to change lanes and the direction of the intended lane change are not clearly indicated by the driver.

In the previously described embodiment, the lane change intent detecting section 8Bb detects an intent of a driver to change lanes and a direction in which the driver intends to change lanes based on a signal from the turn signal switch 20. Instead, it is also acceptable to detect an intent of a driver to change lanes and a direction the intended lane change based on information obtained from an imaging device 50 indicating a viewing direction of the driver. More specifically, based on information obtained from the imaging device 50 indicating a viewing direction of the driver, an amount of time during which the viewing direction of the driver is directed outside a lane in which the vehicle is traveling is detected. If the detected amount of time is equal to or larger than a prescribed amount of time, the apparatus determines than an intent of the driver to change lanes in a direction corresponding to the driver's viewing direction has been detected. Additionally, based on information obtained from the imaging device 50 indicating a viewing direction of the driver, the apparatus can determine if the driver intends to change to an adjacent lane located on the opposite side of the vehicle as an obstacle SM.

The imaging device 50 constitutes the viewing direction detecting device. Thus, by detecting an intent of the driver to change lanes and a direction of the intended lane change based on information obtained from the viewing direction detecting device indicating a viewing direction of the driver, an intent of the driver to change lanes and a direction of the intended lane change can be estimated even when the intent of the driver to change lanes and the direction of the intended lane change are not clearly indicated by the driver.

In the previously described embodiment, the lane change intent detecting section 8Bb detects an intent of a driver to change lanes and a direction in which the driver intends to change lanes based on a signal from the turn signal switch 20. It is acceptable to, instead, detect an intent of the driver to change lanes and a direction of the intended lane change based on route information from a navigation system 40. More specifically, an intent of the driver to change lanes can be detected when route information obtained from the navigation system 40 indicates that a lane change will occur. The direction of the lane change indicated by the route information is assumed to be the direction of the lane change intended by the driver. Additionally, based on route information from a navigation system 40, the apparatus can determine if the driver intends to change to an adjacent lane located on the opposite side of the vehicle as an obstacle SM. For example, if the route information indicates that the vehicle will change lanes to a exit lane in order to exit a highway, then the apparatus can determine if the driver intends to change to an adjacent lane located on the opposite side of the vehicle as an obstacle SM and, more specifically, if the driver intends to change lanes in order to enter an exit lane.

Thus, by detecting an intent of the driver to change lanes and a direction of the intended lane change based on a route information from the navigation system 40, an intent of the driver to change lanes and a direction of the intended lane change can be estimated even when the intent of the driver to change lanes and the direction of the intended lane change are not clearly indicated by the driver.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle driving control apparatus comprising:

an obstacle detecting device configured to detect an existence of an obstacle positioned laterally of a host vehicle in which the vehicle control apparatus is employed;

a future position estimating device configured to estimate a future position of the host vehicle after a prescribed amount of time;

an obstacle avoidance control device configured to execute an obstacle avoidance control with respect to the host vehicle when the existence of an obstacle is detected by the obstacle detecting device such that the obstacle avoidance control device controls the host vehicle based on the estimated future position to prevent the host vehicle from laterally approaching the obstacle whose existence was detected; and a lane change intent detecting device configured to detect an intent of a driver to effect a lane change and a direction of the intended lane change, the obstacle avoidance control device further including a control suppressing portion that suppresses the obstacle avoidance control when the lane change intent detecting device detects that the direction of the intended lane change is the direction of an adjacent lane located on an opposite side of the host vehicle as the side on which the detected obstacle exists.

2. The vehicle driving control apparatus recited in claim 1, wherein
the control suppressing portion is configured to suppress the obstacle avoidance control by shortening the prescribed amount of time such that the obstacle avoidance control is not executed.

3. The vehicle driving control apparatus recited in claim 1, wherein
the control suppressing portion is configured to suppress the obstacle avoidance control by revising a future position of the host vehicle estimated by the future position estimating device.

4. The vehicle driving control apparatus recited in claim 1, wherein
the future position estimating device estimates the future position where the host vehicle will exist after the prescribed amount of time based on a yaw angle, a yaw angle velocity, and a yaw angle acceleration of the host vehicle; and
the control suppressing portion is configured to suppress the obstacle avoidance control by revising at least one of the yaw angle, yaw angle velocity, and yaw angle acceleration used by the future position estimating device to estimate the future position of the host vehicle.

5. The vehicle driving control apparatus recited in claim 1, wherein
the control suppressing portion suppresses the obstacle avoidance control to a greater degree the smaller the width of a traveling lane in which the vehicle having the control apparatus is traveling.

6. The vehicle driving control apparatus recited in claim 1, wherein
the lane change intent detecting device is configured to detect the intent, of the driver to effect the lane change and the direction of the intended lane change based on a turn signal operation detected by a turn signal switch.

7. The vehicle driving control apparatus recited in claim 1, further comprising
a steering input detecting device configured to detect a steering input performed by the driver,
the lane change intent detecting device being configured to detect the intent of the driver to effect a lane change and the direction of the intended lane change based on the steering input detected by the steering input detecting device.

8. The vehicle driving control apparatus recited in claim 1, further comprising
a viewing direction detecting device configured to detect a viewing direction of the driver,
the lane change intent detecting device being configured to detect the intent of the driver to effect the lane change and the direction of the intended lane change based on the viewing direction detected by the viewing direction detecting device.

9. The vehicle driving control apparatus recited in claim 1, wherein
the lane change intent detecting device is configured to detect the intent of the driver to effect the lane change and the direction of the intended lane change based on route information stored in a navigation system.

10. The vehicle driving control apparatus recited in claim 1, wherein
the obstacle avoidance control device controls the host vehicle such that the host vehicle is prevented from laterally approaching the detected obstacle when a transverse position component of the estimated future position of the host vehicle is closer to the detected obstacle than a prescribed transverse position.

11. A vehicle driving control method performed by vehicle driving control apparatus, the vehicle driving control method comprising:
detecting if an obstacle exists laterally of a host vehicle by using an obstacle detecting device of the vehicle driving control apparatus, which is installed on the host vehicle,
predicting a future position at which the host vehicle will exist after a prescribed amount of time by using the vehicle driving control apparatus;
controlling the host vehicle using the vehicle driving control apparatus based on the predicted future position in order to avoid laterally approaching the detected obstacle;
detecting if a driver of the host vehicle intends to change lanes to an adjacent lane located on an opposite side of the host vehicle as the side on which the detected obstacle exists by using a the vehicle driving control apparatus; and
suppressing the controlling of the host vehicle by the vehicle driving control apparatus upon the vehicle driving control apparatus determining that the host vehicle has been operated in a manner that indicates the driver intends to change lanes to the adjacent lane located on the opposite side of the host vehicle as the side on which the detected obstacle exists.

* * * * *